US005486397A

United States Patent [19]

Gordon et al.

[11] Patent Number: 5,486,397

[45] Date of Patent: Jan. 23, 1996

[54] PROTECTED REFLECTION IMAGE

[75] Inventors: James N. Gordon, Newton; Ganghui Teng, Bedford, both of Mass.

[73] Assignee: Polaroid Corporation, Cambridge, Mass.

[21] Appl. No.: 236,491

[22] Filed: Apr. 29, 1994

[51] Int. Cl.$^6$ ..... B32B 1/04

[52] U.S. Cl. ..... 428/76; 428/195; 428/201; 428/203; 428/207; 428/411.1; 428/913

[58] Field of Search ..... 503/227; 156/235, 156/240; 428/203, 204, 212, 913, 914, 76, 195, 201, 207, 411.1

[56] References Cited

U.S. PATENT DOCUMENTS

| | | | |
|---|---|---|---|
| 4,004,924 | 1/1977 | Vrancken et al. | 96/35 |
| 4,123,309 | 10/1978 | Perrington et al. | 156/234 |
| 4,123,578 | 10/1978 | Perrington et al. | 428/206 |
| 4,157,412 | 6/1979 | Deneau | 428/147 |
| 4,171,398 | 10/1979 | Hunt | 428/195 |
| 4,275,106 | 6/1981 | Watanabe | 428/200 |
| 4,282,308 | 8/1981 | Cohen et al. | 430/271 |
| 4,536,434 | 8/1985 | Magnotta | 428/200 |
| 4,547,456 | 10/1985 | Kojima | 430/330 |
| 4,704,310 | 11/1987 | Tighe et al. | 427/261 |
| 4,721,635 | 1/1988 | Helinski | 428/15 |
| 4,775,657 | 10/1988 | Harrison et al. | 503/227 |
| 4,910,070 | 3/1990 | Al'Hariri | 428/181 |
| 5,011,570 | 4/1991 | Ohbayashi | 156/310 |
| 5,182,133 | 1/1993 | Ono et al. | 427/516 |
| 5,220,343 | 6/1993 | Takanashi et al. | 346/1.1 |
| 5,261,987 | 11/1993 | Luening et al. | 156/235 |
| 5,344,808 | 9/1994 | Watanabe et al. | 503/227 |

FOREIGN PATENT DOCUMENTS

| | | |
|---|---|---|
| 631853 | 11/1961 | Canada . |
| WO92/09930 | 6/1992 | WIPO . |

OTHER PUBLICATIONS

PCT International Search Report for PCT/US95/05208 (Form PCT/ISA/210) (mailed Jul. 27, 1995).

*Primary Examiner*—Patrick J. Ryan
*Assistant Examiner*—William A. Krynski
*Attorney, Agent, or Firm*—Renato M. de Luna

[57] ABSTRACT

A protectively reflected binary image is provided comprising a thermally imaged transparency on which is superposed a thin reflective protective overcoat, the imaged transparency comprising a binary image supported on a transparent substrate. The reflective protective overcoat is interfacially bonded to the thermally imaged transparency preferably such that the binary image is interposed between the transparent substrate and the reflective protective overcoat. A method for transferring a reflective protective overcoat onto an imaged transparency is also provided, whereby an image surface of the imaged transparency is protected and made viewable as a reflected image, the method utilizing a laminar transfer sheet comprising a carrier web and a reflective protective overcoat, the laminar transfer sheet being laminated onto the image surface with the carrier web subsequently removed to thereby release the reflective protective overcoat, the overcoat remaining bonded to the image surface.

9 Claims, 4 Drawing Sheets

PROTECTED REFLECTION IMAGE

FIELD OF THE INVENTION

The present invention relates generally to a protected reflection image and to a method of transferring a reflective protective overcoat onto a transparent imaged medium whereby the imaged medium is protected and made viewable as a reflected image.

BACKGROUND OF THE INVENTION

Several methods are available for the production of images viewable by transmitted light. While the resulting imaged transparencies find utility for a number of applications, for certain purposes it has often been desired that the image be viewable as a reflection image. In consideration of the relative fragility of images on certain transparencies, it has also often been desired that such images be protected from damage and environmental stress. Despite the desire for both, the satisfactory unification of "reflective" and "protective" functionalities has been frustrated by their perceived incompatibility, the incompatibility being heightened in the context of predefined preparation, exposure, and development regimens oftentimes associated in the manufacture of imaged transparencies.

As a representative example, an imaged transparency is described in the embodiments disclosed in International Patent Application No. PCT/US87/03249 (Publication No. WO 88/04237) (Etzel), the disclosure being incorporated herein by reference. International Patent Application No. PCT/US87/03249 describes, in one embodiment, a thermal imaging medium and a process for forming an image in which a layer of a porous or particulate image-forming substance (preferably, a layer of carbon black) is deposited on a heat-activatable image-forming surface of a transparent first web material (hereinafter the "first transparent substrate"), the layer having a cohesive strength greater than its adhesive strength to the first sheet like element. Portions of this thermal imaging medium are then exposed to brief and intense radiation (for example, by laser scanning), to firmly attach exposed portions of the image-forming surface to the first transparent substrate. Finally, those portions of the image-forming substance not exposed to the radiation (and thus not firmly attached to the first transparent substrate) are removed, thus forming a binary image comprising a plurality of first areas where the image-forming substance is adhered to the first transparent substrate and a plurality of second areas where the first transparent substrate is free from the image-forming substance. Hereinafter, this type of image will be called a "differential adhesion" binary image. For the purposes of the present disclosure, such binary image may be considered an imaged transparency.

In a principal embodiment of the thermal imaging medium described in the aforementioned International Patent Application, the image-forming substance is covered with a second transparent substrate so that the image-forming substance is confined between the first and second transparent substrates. After imaging and separation of the unexposed portions of the image-forming substance (with the second transparent substrate) from the first transparent substrate, a pair of binary images each supported by a transparent substrate is obtained. A first binary image comprises exposed portions of image-forming substance more firmly attached to the first transparent substrate by heat activation of the heat-activatable image-forming surface. A second binary image comprises non-exposed portions of the image-forming substance carried or transferred to the second transparent substrate. For the purposes of the present disclosure, both binary images may be considered imaged transparencies.

The respective binary images obtained by separating the two transparent substrates of an exposed thermal imaging medium having an image-forming substance confined therebetween may exhibit substantially different characteristics. Apart from being the imagewise "positive" or "negative" of an original, the respective images may differ in character. Differences may depend upon the properties of the image-forming substance, on the presence of the original layer(s) in the medium, and upon the manner in which such layers fail adhesively or cohesively upon separation of the substrates. Either of the pair of images may, for reasons of informational content, aesthetic or otherwise, be desirably considered the principal image, and the invention described herein provides utility with regard to both types of images.

The image-forming process described in the aforementioned International Patent Application can produce high quality, high resolution imaged transparencies. However, for certain applications, the binary images produced on the transparent substrates by this process may suffer from comparatively low durability because, in the finished image, the porous or particulate image-forming substance, typically carbon black admixed with a binder, lies exposed on the surface of the transparent substrate, and may be smeared, damaged or removed by, for example, fingers or other skin surfaces (especially, if moist), solvents or friction during manual or other handling of the image.

Due to their relative fragility and/or environmental sensitivity, previous efforts have been directed toward the protection of such binary images with a protective coating or layer. In this regard, International Patent Application No. PCT/US91/08345 (published as WO 92/09930 on Jun. 11, 1992) (Fehervari, et al.), for example, describes a process for protecting a binary image by lamination thereto of a transparent overcoat. Likewise, pending U.S. patent application Ser. No. 08/065345 (Bloom, et al.) filed May 20, 1993 describes a process for protecting a binary image also involving lamination thereto of a transparent overcoat. With emphasis focussed on maintaining the transparent character of the underlying transparent binary image, neither process provides significant insight into convening an imaged transparency into a reflection image, the reflection image having comparable durability.

Converting an imaged transparency to a durable reflection image poses particular difficulties. First, as indicated above, binary images supported on a transparent substrate are often relatively fragile. Accordingly, especially for those transparencies developed and imaged to a high-resolution, heightened care must be exercised in ensuring that such resolution is not damaged by subsequent post-development conversion processes. Second, exposure of a thermal imaging medium, for example, to produce an imaged transparency typically requires irradiation through a transparent substrate or layer. Prior to such irradiation, incorporation of reflective pigments or a reflective layer may frustrate imagewise exposure; conversion by incorporating reflective pigments or layer would accordingly appear counterproductive. Third, regardless of when and where conversion is effected, compatibility with existing formats provides further constraints against the obvious incorporation of additional materials, such as reflective pigments, into an imaged transparency, pre-protected or otherwise. As a further complication, each of the enumerated difficulties is heightened by the desire to provide an image that is not only viewable by reflection, but one that also has durability comparable to the protected images described in the aforementioned International Patent Application No. PCT/US 91/08345 and U.S. patent application Ser. No. 08/065345.

In light of the above, there is a need for means whereby an imaged transparency may be converted into an image capable of being viewed by reflected light, the resulting reflection image being durable. With regard to durability, the resulting reflection image should be, for example, suitable for archival purposes, abrasion-resistant, permit repeated solvent washings without risk of separating the durable layer from the underlying imaged transparency, and capable of maintaining the unitary integrity of the reflection image when cut into smaller sheets.

SUMMARY OF THE INVENTION

In view of the above need, the present invention presents a protected reflective binary image. The protectively reflected binary image comprises a thermally imaged transparency on which a reflective protective overcoat is superposed, the imaged transparency comprising a binary image supported on a transparent substrate, the binary image formed from a porous or particulate image-forming substance. The reflective protective overcoat is interfacially bonded to the imaged transparency preferably such that the binary image is interposed between the transparent substrate and the reflective protective overcoat. For the manufacture of, for example, such protectively reflected binary image, a method for convening an imaged transparency is provided. According to the method, a laminar transfer sheet is utilized, the laminar transfer sheet comprising a carrier web and a reflective protective overcoat, the laminar transfer sheet being laminated onto the image surface of the imaged transparency with the carrier web subsequently removed to thereby release the reflective protective overcoat, the overcoat remaining bonded to the image surface.

In view of the description provided herein, it is one object of the present invention to provide means by which both a durable layer and a reflection layer may be transferred from a carrier web onto a transparent imaged receiving unit such that the image surface of the receiving unit is protected and secured, and such that the image on the receiving unit may be viewed as a reflected image by means of the reflective background provided by the reflection layer.

It is another object of the present invention to provide means by which a reflective protective overcoat may be carried on a carrier web, the overcoat and carrier web conveyed into substantial interfacial association with an imaged transparency, laminated one onto another, and the carrier web removed by peeling, whereby substantially all of the overlying reflective protective overcoat subjected to the heat and pressure of lamination are retained on the imaged transparency.

It is another object of the present invention to provide an imaged transparency resultant of a thermal transfer process having thereon superposed a durable protective layer and a reflective layer.

For a fuller understanding of these and other objects of the invention, reference should be had to the following description taken in conjunction with the accompanying drawings.

DETAILED DESCRIPTION OF THE INVENTION

In a product of the present invention, a protectively reflected binary image is provided comprising a thermally imaged transparency and, superposed over said transparency, a reflective protective overcoat. The imaged transparency comprises a transparent supporting substrate and a binary image supported on the substrate, the binary image being a plurality of first areas at which a porous or particulate image-forming substance is adhered to the substrate and a plurality of second areas at which the substrate is free from the image-forming substance. The reflective protective overcoat has at least a durable layer and an opaque area generally corresponding with the extents of the binary image, the opaque area having incorporated therein a substantially uniform distribution of reflective pigment. The opaque area is configured to provide a blanketwise uniform reflective background against which the binary image of the imaged transparency may be accurately viewed. The reflective protective overcoat is interfacially bonded to the thermally imaged transparency such that the binary image is interposed between the transparent supportive substrate and the reflective protective overcoat whereby the protected binary image may be viewed through the transparent supporting substrate as reflected against the opaque area.

Figure 6:
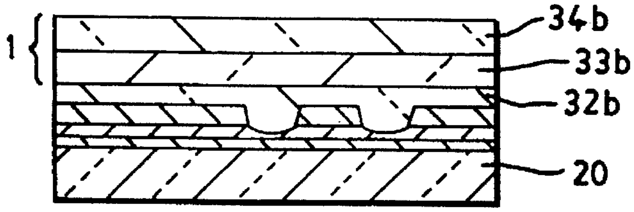
FIG. 6 schematically illustrates a protectively reflected binary image produced after complete removal of the carrier web.

A preferred embodiment of the protectively reflected binary image is illustrated in FIG. 6. Briefly, as shown in FIG. 6, the protectively reflected binary image has a binary image surface supported on a transparent substrate 20 and onto which reflective protective overcoat 1, comprising durable layer **34*b* and reflective layer 33*b*, is superposed. As described further below, reflective protective overcoat 1 is adhered to the binary image surface through adhesive layer 32*b***.

Figure 3:
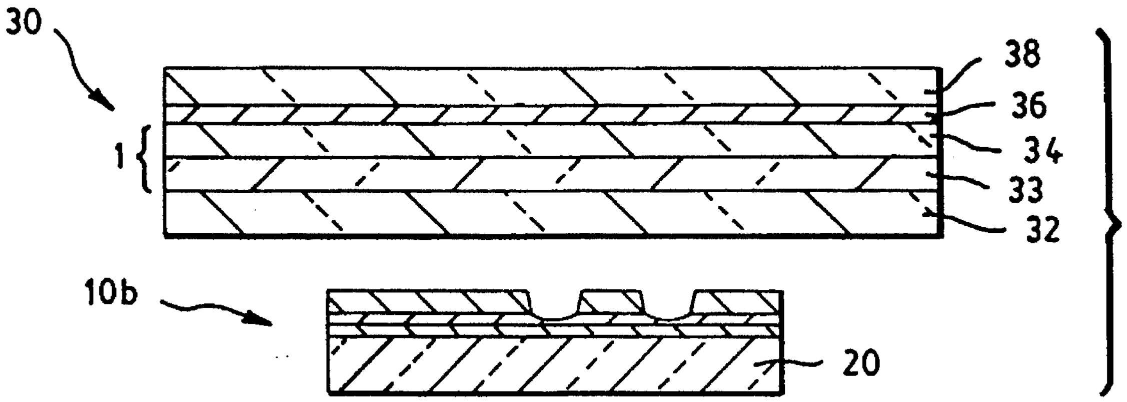
FIG. 3 schematically illustrates one of the binary images (i.e., an imaged transparency) shown in FIG. 2 and a laminar transfer sheet carrying therein a reflective protective overcoat useful in the process of the present invention.

The protectively reflected binary image may be obtained through an inventive process wherein a reflective protective overcoat is blanketwise transferred onto the binary image from a laminar transfer sheet. Accordingly, in a process encompassed by the present invention, a binary image having an image surface comprising a plurality of first areas, at which a porous or particulate imaging material is adhered to a transparent substrate, and a plurality of second areas, at which the transparent substrate is free from the imaging material, is protected using a reflective protective overcoat, the reflective protective overcoat having a reflective opaque area corresponding at least with the extents of the image surface and comprising at least a durable layer. The reflective protective overcoat is configured such that it is capable of being made bondable to the image surface upon activation, for example, by heat. The reflective protective overcoat is initially releasably carried on a laminar transfer sheet. FIG. 3 shows a preferred laminar transfer sheet 30, comprising a reflective protective overcoat 1 releasably carried on carrier web 38 through release layer 36. As shown, reflective protective overcoat 1 is comprised of durable layer 34 and reflection layer 33, reflection layer 33 being preferably associated with adhesive layer 32.

Figure 4:
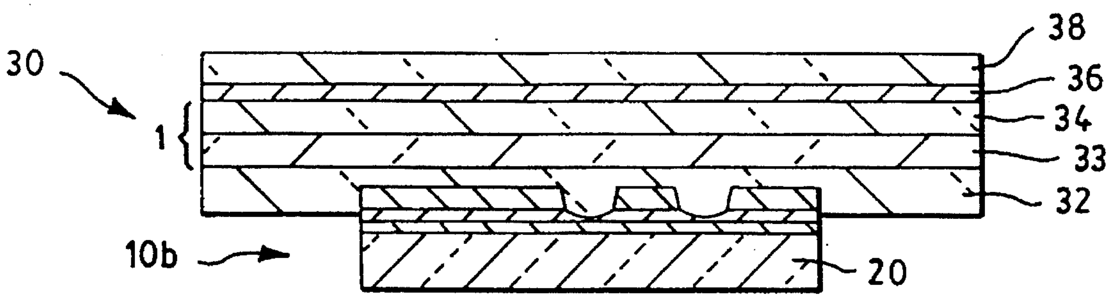
FIG. 4 schematically illustrates the binary image and the laminar transfer sheet shown in FIG. 3 after lamination onto the image surface of the binary image.

In converting an imaged transparency (e.g., the afore-described binary image), the laminar transfer sheet 30 and the image surface of the binary image 10*b* are brought into substantial interfacial association such that the opaque area (e.g., reflection layer 33) blanketwise covers the extents of the image surface. In this regard, and as shown in FIG. 3, the durable layer 34 will be interposed between the carrier web 38 and the image surface of the binary image 10*b*. As shown in FIG. 4, it is oftentimes desirable that laminar transfer sheet protrude beyond the periphery of the image on all sides. The laminar transfer sheet 30 is then subjected to heat and pressure, thereby activating sheet 30 to effect interfacial bonding of the reflective protective overcoat 1 (preferably by the functionality of adhesive layer 32) to the image surface of binary image 10*b*. See, FIG. 4. The carrier web is then removed from the laminar transfer sheet such that the reflective protective overcoat 1 is released from the carrier web 38 (preferably by the functionality of release layer 36), the reflective protective overcoat 1 remaining substantially interfacially bonded to the binary image; conveniently, one edge of the laminar transfer sheet 30 is gripped, manually by an operator or mechanically, and the carrier web 38 simply peeled away from the reflective protective overcoat. See, FIG. 5.

Figure 5:
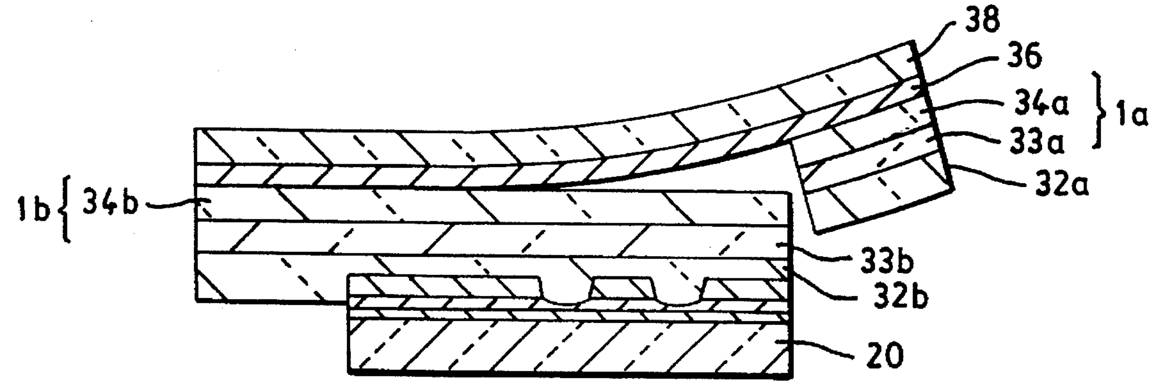
FIG. 5 schematically illustrates the "binary image/laminar transfer sheet" laminate shown in FIG. 4, as a carrier web used to carry the reflective protective overcoat is separated from the laminate.

As seen in FIG. 5, in peripheral portions of laminar transfer sheet 30 where the reflective protective overcoat is not attached to binary image 10*b*, peripheral portions 1*a* (i.e., 34*a* and 33*a*) and 32*a* of the reflective protective overcoat and adhesive layer, respectively, remain attached to the carrier web 38, while the central portions 1*b* and 32*b* remain attached to binary image 10, with adhesive layer 32 and the reflective protective overcoat 1 breaking substantially along the periphery, thereby providing clean images to the protectively reflected image. Depending upon the nature of the release layer 36 (if any), none, part, or all of the release layer may remain with the central portions 32*b* and 34*b* of the adhesive layer 32 and reflective protective overcoat 1 on the image 10*b*. In the embodiment illustrated in the drawings, the central portions 32*b* of the adhesive layer 32 and the reflective protective overcoat 1 respectively (together with any release layer 36 remaining therewith) form a durable and reflective coating over the image 10*b*.

While the process described herein is preferred for the manufacture of protectively reflected binary images, its utility extends to the conversion of other types of imaged transparencies, such as those produced by, for example, thermal transfer systems (such as sublimation transfer and melt transfer); printing systems (such as offset printing), laser ablation, ink jet recording systems, static toner systems, and the like.

The carrier web 38 of the laminar transfer sheet 30 may be formed from any material which can withstand the conditions which are required to laminate the transfer sheet to the imaged transparency and which is sufficiently coherent and adherent to the reflective protective overcoat 1 to permit displacement of the carrier web 38 away from the protectively reflected image after lamination, with removal of those portions, if any, of the reflective protective overcoat 1 which extend beyond the periphery of the substrate. Typically, the carrier web 38 is a plastic film. Polyester (especially poly(ethylene terephthalate)) films are preferred. A film with a thickness in the range of about 0.5 to about 2 mil (13 to 51 μm) has been found satisfactory. If desired, the carrier web 38 may be treated with a subcoat or other surface treatment, such as will be well known to those skilled in the coating art in view of the present disclosure, to control its surface characteristics, for example to increase or decrease the adhesion of the durable layer or other layers (see below) to the carrier web 38.

The reflective functionality of the reflective protective overcoat is provided by the overcoat's opaque area. In the preferred embodiment, the opaque area is a blanketwise uniform reflective layer deposited between the durable layer and the carrier web. While thickness may vary among different applications, it is preferred that the reflection layer not have a thickness greater than about 10μm, and most desirable this thickness is in the range of 2 to 6 μm. It will be appreciated that the thickness of the reflective layer (and durable layer as indicated below) is much thinner than the transparent substrate of the binary image. Accordingly, "supportive functionality" as directed to "supporting" of the particular or porous components of the binary image is provided primarily by the substrate, not the reflective protective overcoat. Such aspect provides advantage by facilitating the transfer of the reflective protective overcoat from the laminar transfer sheet to the binary image according to the method of the present invention. Advantages relating to stability and manufacturing and process efficiencies are also effected.

The reflective layer can be prepared from any number of materials that are compatible with the other layers of the laminar transfer sheet and which will provide reflective functionality. Such will be known to those skilled in the art in light of the present disclosure. Regardless, in a principal configuration, the reflection layer formulation comprises a dispersal of highly reflective (white) pigments (most preferably based on titanium dioxide) in a suitable macromolecular binder. Reflective pigments that may be considered for use would include: zinc oxide, zinc sulfide, lead carbonate, carbon white (i.e. fluorinated carbon black), polymers with encapsulated air voids, calcium carbonate, calcium sulfate, antimony oxide, magnesium carbonate, strontium sulfate, barium sulfate, barium carbonate, calcium silicate, and silicon oxide. Macromolecular binders that may be considered for use would include: vinylidene chloride copolymers (e.g., vinylidene chloride/acrylonitrile copolymers, vinylidene chloride/methylmethacrylate copolymers and vinylidene chloride/vinyl acetate copolymers); ethylene/vinyl acetate copolymers; cellulose esters and ethers (e.g., cellulose acetate butyrate, cellulose acetate propionate, and methyl, ethyl benzyl cellulose); synthetic rubbers (e.g., butadiene/acrylonitrile copolymers; chlorinated isoprene and 2-chloro-1,3-butadiene polymers); polyvinylesters (e.g. vinyl acetate/acrylate copolymers, poly(vinyl acetate) and vinyl acetate/methylmethacrylate copolymers); acrylate and methacrylate copolymers (e.g., polymethylmethacrylate); vinyl chloride copolymers (e.g., vinyl chloride/vinylacetate copolymers); and diazo resins such as the formaldehyde polymers and copolymers of p-diazo-diphenylamine.

Depending on the binder and reflective pigment utilized, the reflective layer formulations may also include sufactants, dispersal agents, and/or plasticizers. Specific examples of reflective layer formulations known to the inventors are provided in the Examples, infra.

While the use of a reflection layer is the principal and preferred mode of practice, it is envisioned that the opaque area may be the durable layer, the durable layer being modified to provide it with reflective functionality. See e.g., Examples 7 and 8, infra. In this regard, the reflective pigment materials may be dispersed in the durable layer formulation prior to incorporation into the laminar transfer sheet. It will be appreciated, however, that such incorporation could reduce the protective functionality of the durable layer, by reducing, for example, the degree of crosslinking that occurs when the durable layer is cured.

Under certain conditions, discontinuities such as "pinholes" and "mottle" may be found in reflection layers prepared from certain reflection layer formulations. If such "pinholes" and "mottle" are undesirable for a given application, one effective solution would be to deposit such reflection layer formulation by two-pass coating.

When used for the above described binary image, the reflection layer should effect a reflection $D_{min}$ of approximately 0.12 to 0.16 in areas without image carbon, a reflection $D_{max}$ of approximately 2.2 and a reflective layer transmission density of about 0.64. It will be appreciated that in certain embodiments, transmission density is such that the protectively reflected image may be viewable as a transmitted image on, for example, alight box, while viewable as a reflective image under normal ambient lighting conditions.

The durable layer of the reflective protective overcoat may be formed from any material which confers the desired properties upon the durable layer formed on the image. In general, it is preferred that the durable layer not have a thickness greater than about 10 μm, and most desirable this thickness is in the range of 2 to 6 μm. The durable layer should of course be resistant to materials with which it is likely to come into contact, including materials which may be used to clean the image. Although the exact materials which may contact the image will vary with the intended use of the protected image, in general it is desirable that the material for the durable layer be substantially unchanged by contact with water, isopropanol and petroleum distillates. Preferably the durable layer should be resistant to any other materials with which it may come into contact, for example accidental spills of coffee, which have a very deleterious effect on some plastics.

It has been found that the protection of the image conferred by the durable layer is increased when the durable layer has high lubricity. Preferably, at least one of a wax, a solid silicone, and a silicone surfactant is included in the durable layer to increase the lubricity of this layer.

To produce a smooth, thin durable layer, it is convenient to form the durable layer in situ by forming the necessary polymerizable mixture, spreading a layer of the mixture upon the support layer, and subjecting the layer of the mixture to conditions effective to cause polymerization to form the final durable layer, provided of course that the polymerization technique used is one which can be practiced under these conditions.

The properties of the durable layer formed on the image are not necessarily the same as those of the durable layer in the reflective protective overcoat, since the physical and/or chemical properties of the durable layer may be changed during the lamination step. For example, the durable layer of the reflective protective overcoat may comprise a latex having a plurality of discrete particles which coalesce during the lamination, thereby forming a continuous durable layer on the image.

The durable layer may be formulated and incorporated into the laminar transfer sheet by conventional processes known in the art. A typical durable layer will incorporate an organic polymeric material, such as an acrylic polymer, derived from a monomer capable of forming a homopolymer sufficiently durable for the desired degree of protective functionality. Other formulations and methods of preparing the durable layer can be derived from the examples presented in the aforementioned patent applications. For example, International Patent Application No. PCT/US91/08345 describes an embodiment wherein the durable layer is coated as a discontinuous layer which clears during lamination to produce a clear durable layer. As described, the durable layer comprised 80% by weight acrylic polymer, 10% by weight aqueous-based nylon binder, and was prepared by mixing the polymer and wax latices, adding the binder, then adding a silicone surfactant. The International Application also describes a durable layer comprising an acrylic polymer latex (90% by weight) to which was added a poly(vinyl alcohol) binder (10% by weight); and another durable layer comprising 96% by weight poly(methyl methacrylate), 2% by weight silicone surfactant, 1% by weight magnesium silicate, and 1% by weight polypropylene wax. In U.S. patent application Ser. No. 08/065,345, a durable layer is described as substantially transparent and comprising a polymeric organic material having therein incorporated a siloxane.

In the present process, the reflective protective overcoat may extend beyond the periphery of the substrate at one or more points, and the "excess" overcoat extending beyond the periphery of an imaged transparency remains attached to the carrier web, so that the durable layer breaks substantially along the periphery of the substrate; in practice, one normally uses a reflective protective overcoat larger in both dimensions than the substrate of the image to be protected, and arranges the reflective protective overcoat so that it extends beyond the periphery of the substrate all around the substrate, since this avoids any need to achieve accurate registration of the reflective protective overcoat with the image and also ensures that no part of the image goes unprotected. To ensure that the durable layer breaks accurately along the periphery of the substrate, thereby providing a flush edge on the protected image, the durable layer and the reflection layer may comprise a continuous phase and a particulate solid dispersed in the continuous phase, since the presence of such a solid provides failure nuclei and thus assists accurate breakage of the reflective protective overcoat. A preferred particulate solid for this purpose is magnesium silicate.

The laminar transfer sheet may comprise additional layers besides the reflection layer, durable layer, and carrier web. For example, the laminar transfer sheet may comprise a release layer interposed between the durable layer and the carrier web, this release layer being such that, in the areas where the durable layer remains attached to the image, separation of the durable layer from the carrier web occurs by failure within or on one surface of the release layer. The release layer is preferably formed from a wax, or from a silicone. As will be apparent to those skilled in the art, in some cases part or all of the release layer may remain on the surface of the durable coating after the carrier web has been removed therefrom. It will be appreciated that some reflective protective overcoats will release cleanly from a carrier web without the need for a separate release layer, and such layer may be accordingly omitted.

The laminar transfer sheet may also comprise an adhesive layer disposed on the surface of the durable layer remote from the support layer so that, during the lamination, the durable layer and opaque layer laminate is adhered to the image by the adhesive layer. Some reflective protective overcoats can be satisfactorily laminated to an imaged transparency simply by application of heat and/or pressure during the lamination step. In other cases, however, the use of an adhesive layer is desirable to achieve strong adhesion between the image and the reflective protective overcoat and/or to lower the temperature needed for lamination. Various differing types of adhesive may be used to form the adhesive layer; for example, the adhesive layer might be formed from a thermoplastic adhesive having a glass transition temperature in the range of about 50° to about 120° C. (in which case the lamination is effected by heating the adhesive layer above its glass transition temperature), an ultraviolet curable adhesive (in which case the lamination is effected by exposing the adhesive layer to ultraviolet radiation, thereby curing the adhesive layer), or a pressure sensitive adhesive having an adhesion to steel of about 22 to about 190 grams per millimeter (in which case the lamination is effected simply by pressure).

As to the underlying binary image used in the preferred product and briefly introduced above, description shall be made, by way of illustration, with reference to the accompanying drawings.

Figure 1:
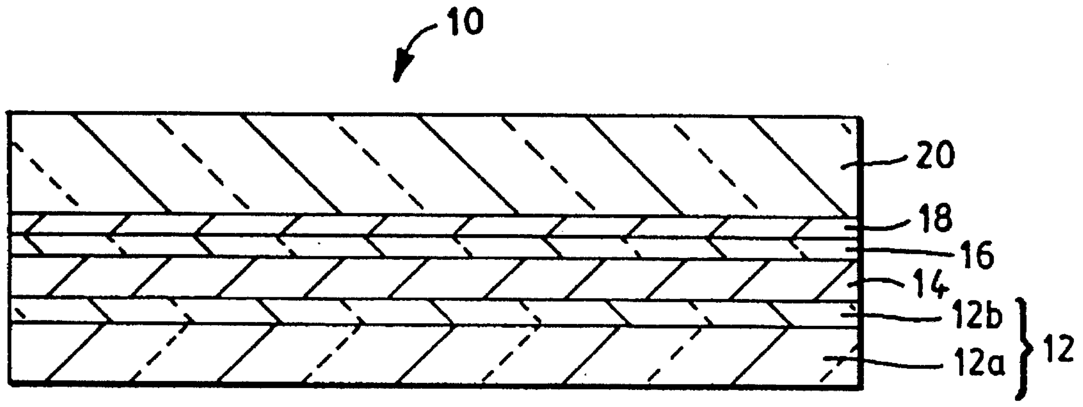
FIG. 1 of the accompanying drawings schematically illustrates in section a thermal imaging medium embodiment of the type described in the International Patent Application No. PCT/US87/03249 (Publication No. WO 88/04237).
Figure 2:
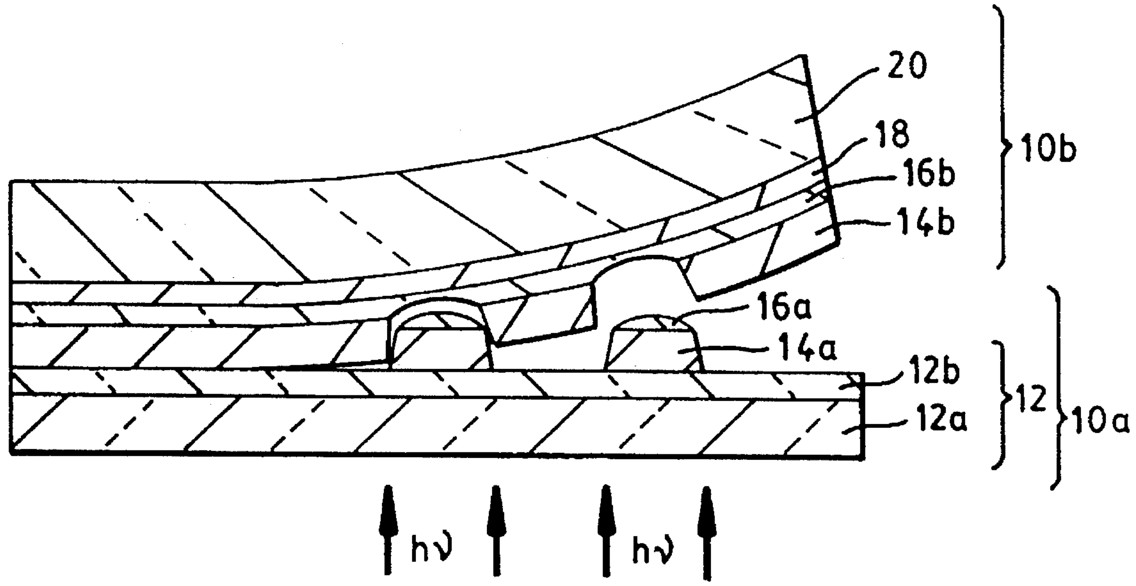
FIG. 2 schematically illustrates the thermal imaging medium shown in FIG. 1 after imagewise exposure as first and second transparent elements thereof are being separated to form a pair of complementary binary images.

In FIG. 1, there is shown a thermal imaging laminar medium 10 suited to use in the production of a pair of binary images, shown as binary images **10*a* and 10*b* in a state of partial separation in FIG. 2. Thermal imaging medium 10 includes a first sheet-like web material 12 having superposed thereon, and in order, porous or particulate image-forming layer 14, release layer 16, adhesive layer 18 and second sheet-like web material 20. Upon exposure of the thermal imaging medium 10 to radiation, exposed portions of image-forming layer 14 are attached firmly to sheet-like web material 12, so that, upon separation of the respective sheet-like web materials, as shown in FIG. 2, a pair of binary images, 10*a* and 10*b*, is provided. The nature of the layers of thermal imaging medium 10 and their properties are importantly related to the manner in which the respective images are partitioned from the thermal imaging medium after exposure. The various layers of thermal imaging medium 10** are described in detail hereinafter.

In a representative embodiment useful in practice of the present invention, sheet-like web material 12 comprises a transparent material through which imaging medium 10 can be exposed to radiation. Web material 12 can comprise any of a variety of transparent sheet-like materials, although transparent polymeric sheet materials will be especially preferred. Among preferred web materials are polystyrene, polyester (desirably, poly(ethylene terephthalate)), acrylic polymers (for example poly(methyl methacrylate), polyethylene, polypropylene, poly(vinyl chloride), polycarbonate, poly(vinylidene chloride), cellulose acetate, cellulose acetate butyrate and copolymeric materials such as the copolymers of styrene, butadiene and acrylonitrile, including poly(styrene-co-acrylonitrile).

The surface of web material 12 is important to the thermal imaging of medium 10. At least a surface zone or layer of web material 12 comprises a polymeric material which is heat activatable upon subjection of medium 10 to brief and intense radiation, so that, upon rapid cooling, exposed portions of the surface zone or layer are firmly attached to image-forming layer 14. According to the representative embodiment, web material 12 comprises a portion **12*a*, of a web material such as polyethylene terephthalate, having a surface layer 12*b* of a polymeric material that can be heat activated at a temperature lower than the softening temperature of portion 12*a*. A suitable material for surface layer 12*b* comprises a polymeric material which tends readily to soften so that exposed portions of layer 12*b* and layer 14 can be firmly attached to web 12**. A variety of polymeric materials can be used for this purpose, including polystyrene, poly(styrene-co-acrylonitrile), poly(vinyl butyrate), poly(methyl methacrylate), polyethylene and poly(vinyl chloride).

The employment of a thin surface layer **12*b* on a substantially thicker and durable web material 12*a* permits desired handling of web material 12 and desired imaging efficiency. It will be appreciated, however, that web 12 can comprise a unitary sheet material (not shown) provided that, upon exposure of the medium to radiation and absorption of light and conversion to heat, the web material and particularly the surface portion or zone thereof adjacent layer 14 can be made to firmly attach to the image-forming material of layer 14**.

In general, the thickness of web material 12 will depend upon the desired handling characteristics of medium 10 during manufacture, on imaging and post-imaging separation steps and on the desired and intended use of the image to be carried thereon. Typically, web material 12 will vary in thickness from about 0.5 to 7 mils (13 to 178 μm). Thickness may also be influenced by exposure conditions, such as the power of the exposing source of radiation. Good results can be obtained using a polymeric sheet having a thickness of about 0.75 mil (0.019 mm) to about two mils (0.051 mm) although other thicknesses can be employed.

Where surface zone **12*b* of web material 12 comprises a discrete layer of polymeric material, layer 12*b* will be very thin and typically in the range of about 0.1 to 5 μm. The use of a thin layer 12*b* facilitates the concentration of heat energy at or near the interface between layers 12*b* and 14 and permits optimal imaging effects and reduced energy requirements. It will be appreciated that the sensitivity of layer 12*b* to heat activation (or softening) and attachment or adhesion to layer 14 will depend upon the nature and thermal characteristics of layer 12*b* and upon the thickness thereof. Good results are obtained using, for example, a web material 12 having a thickness of about 1.5 to 1.75 mils (38 to 44 μm) carrying a surface layer 12*b*** of poly(styrene-co-acrylonitrile) having a thickness of about 0.1 to 5 μm. Other web materials can, however, be employed.

A discrete layer **12*b* of heat-activatable material can be provided on a web material 12*a* by resort to known coating methods. For example, a layer of poly(styrene-co-acrylonitrile) can be applied to a web 12*a* of polyethylene terephthalate by coating from an organic solvent such as methylene chloride. If desired, web material 12*a* can contain additional subcoats (not shown) such as are known in the art to facilitate adhesion of coated materials. If desired, an additional compressible layer (not shown) having stress-absorbing properties can be included in medium 10 as an optional layer between web material 12*a* and surface layer 12*b*. Such optional and compressible layer serves to absorb physical stresses in medium 10 and to prevent undesired delamination at the interface of layer 12*b* and layer 14. Inclusion of a compressible layer facilitates the handling and slitting of medium 10** and permits the conduct of such manipulatory manufacturing operations as may otherwise result in stressinduced delamination. A thermal imaging medium incorporating a stress-absorbing layer is described and claimed in U.S. Pat. No. 5,200,297, issued to Neal F. Kelly on Apr. 6, 1993.

Image-forming layer 14 comprises an image-forming substance deposited onto layer 12*b* as a porous or particulate layer or coating. Layer 14, referred to as a colorant/binder layer, can be formed from a colorant material dispersed in a suitable binder, the colorant being a pigment or dye of any desired color, and preferably, being substantially inert to the elevated temperatures required for thermal imaging of medium 10. Carbon black is a particularly advantageous and preferred pigment material. Preferably, the carbon black material will comprise particles having an average diameter of about 0.01 to 10 μm. Although the description hereof will refer principally to carbon black, other optically dense substances, such as graphite, phthalocyanine pigments, and other colored pigments can be used. If desired, substances which change their optical density upon subjection to temperatures as herein described can also be employed.

The binder for the image-forming substance of layer 14 provides a matrix to form the porous or particulate substance thereof into a cohesive layer and serves to adhere layer 14 to layer 12*b*. Layer 14 can be conveniently deposited onto layer 12*b* using any of a number of known coating methods. According to a preferred embodiment, and for ease in coating layer 14 onto layer 12*b*, carbon black particles are initially suspended in an inert liquid vehicle (typically, water) and the resulting suspension or dispersion is uniformly spread over layer 12*b*. On drying, layer 14 is adhered as a uniform image-forming layer onto the surface of layer 12*b*. It will be appreciated that the spreading characteristics of the suspension can be improved by including a surfactant, such as ammonium perfluoroalkyl sulfonate, nonionic ethoxylate, or the like. Other substances, such as emulsifiers can be used or added to improve the uniformity of distribution of the carbon black in its suspended state and, thereafter, in its spread and dry state. Layer 14 can range in thickness and typically will have a thickness of about 0.1 to about 10 μm. In general, it will be preferred, from the standpoint of image resolution, that a thin layer be employed. Layer 14 should, however, be of sufficient thickness to provide desired and predetermined optical density in the images prepared from imaging medium 10.

Suitable binder materials for image-forming layer 14 include gelatin, poly(vinyl alcohol), hydroxyethyl cellulose, gum arabic, methyl cellulose, polyvinylpyrrolidone, polyethyloxazoline, and poly(styrene-co-maleic anhydride). The ratio of pigment (e.g., carbon black) to binder can be in the range of from 40:1 to about 1:2 on a weight basis. Preferably, the ratio of pigment to binder will be in the range of from about 4:1 to about 10:1. A preferred binder material for a carbon black pigment material is polyvinyl alcohol.

If desired, additional additives or agents can be incorporated into image-forming layer 14. Thus, submicroscopic particles, such as chitin, polytetrafluoroethylene particles and/or polyamide and/or polystyrene latex can be added to colorant/binder layer 14 to improve abrasion resistance. Such particles can be present, for example, in amounts of from about 1:2 to about 1:20, particles to layer solids, by weight.

As can be seen from FIG. 2, the relationships of adhesivity and cohesivity among the several layers of imaging medium 10 are such that separation occurs between layer 14 and surface zone or layer 12*b* in non-exposed regions. Thus, imaging medium 10, if it were to be separated without exposure, would separate between surface zone or layer 12*b* and layer 14 to provide a $D_{max}$ on sheet 20. The nature of layer 14 is such, however, that its relatively weak adhesion to surface zone or layer 12*b* can be substantially increased upon exposure. Thus, as shown in FIG. 2, exposure of medium 10 to brief and intense radiation in the direction of the arrows and in the areas defined by the respective pairs of arrows, serves in the areas of exposure to substantially lock or attach layer 14, as portions 14*a*, to surface zone or layer 12*b*.

Attachment of weakly adherent layer 14 to surface zone or layer 12*b* in areas of exposure is accomplished by absorption of radiation within the imaging medium and conversion to heat sufficient in intensity to heat activate surface zone or layer 12*b* and on cooling to more firmly join exposed regions or portions of layer 14 and surface zone or layer 12*b*. Thermal imaging medium 10 is capable of absorbing radiation at or near the interface of surface zone or layer 12*b* of heat-activatable polymeric material and layer 14. This is accomplished by using layers in medium 10 which by their nature absorb radiation and generate the requisite heat for desired thermal imaging, or by including in at least one of the layers, an agent capable of absorbing radiation of the wavelength of the exposing source. Infrared-absorbing dyes can, for example, be suitably employed for this purpose.

Porous or particulate image-forming layer 14 can comprise a pigment or other colorant material such as carbon black which is absorptive of exposing radiation and which is known in the thermographic imaging field as a radiation-absorbing pigment. While a radiation-absorbing pigment in layer 14 may be essentially the only absorber of radiation in medium 10, inasmuch as a secure bonding or joining is desired at the interface of layer 14 and surface zone or layer 12*b*, it is preferred that a light-absorbing substance be incorporated into either or both of layer 14 and surface zone or layer 12*b*.

Suitable light-absorbing substances in layers 12*b* and/or 14, for converting light into heat, include carbon black, graphite or finely divided pigments such as the sulfides or oxides of silver, bismuth or nickel. Dyes such as the azo dyes, xanthene dyes, phthalocyanine dyes or the anthraquinone dyes can also be employed for this purpose. Especially preferred are materials which absorb efficiently at the particular wavelength of the exposing radiation. In this connection, infrared-absorbing dyes which absorb in the infrared-emitting regions of lasers which are desirably used for thermal imaging are especially preferred. Suitable examples of infrared-absorbing dyes for this purpose include the alkylpyrylium-squarylium dyes, disclosed in U.S. Pat. No. 4,508,811, and including 1,3-bis[(2,6-di-t-butyl-4H-thiopyran-4-ylidene) methyl]-2,4-dihydroxy-dihydroxide-cyclobutenediylium-bis{innersalt}. Other suitable IR-absorbing dyes include 4-[7-(4H-pyran-4-ylide)hepta-1,3,5-trienyl]pyrylium tetraphenylborate and 4-[[3-[7-diethylamino-2-(1,1-dimethylethyl)-(benz[ b]-4H-pyran-4-ylidene)methyl]-2-hydroxy-4-oxo-2-cyclobuten-1-ylidene] methyl]-7-diethylamino-2-(1,1-dimethylethyl)benz[b]pyrylium hydroxide inner salt. Such IR-absorbing dyes are disclosed in, for example, U.S. Pat. No. 5,227,499, issued to D. A. McGowan et al. on Jul. 13, 1993, U.S. Pat. No. 5,262,549, issued to S. J. Telfer et al. on Nov. 16, 1993, and International Patent Application No. PCT/US91/08695 (Publication No. WO 92/09661).

As shown in FIG. 2, exposed regions or portions of layer 14 separate sharply from non-exposed regions. Layer 14 is an imagewise disruptible layer owing to the porous or particulate nature thereof and the capacity for the layer to fracture or break sharply at particle interfaces. From the standpoint of image resolution or sharpness, it is essential that layer 14 be disruptible, such that a sharp separation can occur between exposed and unexposed regions of the thermally imaged medium, through the thickness of the layer 14 and along a direction substantially orthogonal to the interface of the layers 14 and 12*b*, i.e., substantially along the direction of the arrows in FIG. 2.

Shown in imaging medium 10 is a second sheet-like web material 20 covering image-forming layer 14 through adhesive layer 18 and release layer 16. Web material 20 is laminated over image-forming layer 14 and serves as the means by which non-exposed areas of layer 14 can be carried from web material 12 in the form of image 10*b*, as shown in FIG. 2. Preferably, web material 20 will be provided with a layer of adhesive to facilitate lamination. Adhesives of the pressure-sensitive and heat-activatable types can be used for this purpose. Typically, web material 20 carrying adhesive layer 18 will be laminated onto web 12 using pressure (or heat and pressure) to provide a unitary lamination. Suitable adhesives include poly(ethylene-co-vinyl acetate), poly(vinyl acetate), poly(ethylene-co-ethyl acrylate), poly(ethylene-co-methacrylic acid) and polyesters of aliphatic or aromatic dicarboxylic acids (or their lower alkyl esters) with polyols such as ethylene glycol, and mixtures of such adhesives.

The properties of adhesive layer 18 can vary in softness or hardness to suit particular requirements of handling of the imaging medium during manufacture and use and image durability. A soft adhesive material of suitable thickness to provide the capability of absorbing stresses that may cause an undesired delamination can be used, as is disclosed and claimed in the aforementioned U.S. Pat. No. 5,200,297 to N. F. Kelly. If desired, a hardenable adhesive layer can be used and cutting or other manufacturing operations can be performed prior to hardening of the layer, as is described in International Patent Application No. PCT/US91/08585 (Publication No. WO 92/09411).

Preferred in the representative embodiment, and as shown in FIG. 1, release layer 16 is included in thermal imaging medium 10 to facilitate separation of images 10*a* and 10*b* according to the mode shown in FIG. 2. As described hereinbefore, regions of medium 10 subjected to radiation become more firmly secured to surface zone or layer 12*b* by reason of the heat activation of layer 12 by the exposing radiation. Non-exposed regions of layer 14 remain only weakly adhered to surface zone or area 12*b* and are carried along with web 20 on separation of web materials 12 and 20. This is accomplished by the adhesion of layer 14 to surface zone or layer 12*b*, in non-exposed regions, being less than: (a) the adhesion between layers 14 and 16; (b) the adhesion between layers 16 and 18; (c) the adhesion between layers 18 and 20; and (d) the cohesivity of layers 14, 16 and 18. The adhesion of web material 20 to porous or particulate layer 14, while sufficient to remove non-exposed regions of layer 14 from web surface zone or layer 12*b*, is controlled, in exposed areas, by release layer 16 so as to prevent removal of firmly attached exposed portions of layers 14*a* (attached to surface zone or layer 12*b* by exposure and by heat activation thereof).

Release layer 16 is designed such that its cohesivity or its adhesion to either adhesive 18 or porous or particulate layer 14 is less, in exposed regions, than the adhesion of layer 14 to surface zone or layer 12*b*. The result of these relationships is that release layer 16 undergoes an adhesive failure in exposed areas at the interface between layers 14 and 18, or at the interface between layers 16 and 14; or, as shown in FIG. 2, a cohesive failure of layer 16 occurs, such that portions (16*b*) are present in image 10*b* and portions (16*a*) are adhered in exposed regions to porous or particulate layer 14. Portions 16*a* of release layer 16 may serve to provide some surface protection for the image areas of image 10*a*, against abrasion and wear; however, the degree of protection provided by portions 16*a* is limited, and if image 10*a* is to be retained and used, in most cases it is advantageous to protect image 10*a* as is afforded (among other advantages) by the practice of the present process, the process being discussed in more detail below.

Release layer 16 can comprise a wax, wax-like or resinous material. Microcrystalline waxes, for example, high-density polyethylene waxes available as aqueous dispersions, can be used for this purpose. Other suitable materials include carnauba, beeswax, paraffin wax and wax-like materials such as poly(vinyl stearate), poly(ethylene sebacate), sucrose polyesters, polyalkylene oxides and dimethylglycol phthalate. Polymeric or resinous materials such as polystyrene, poly(methyl methacrylate) and copolymers of methyl methacrylate and monomers copolymerizable therewith can be employed. If desired, hydrophilic colloid materials, such as poly(vinyl alcohol), gelatin or hydroxyethyl cellulose can be included as polymer binding agents.

Resinous materials, typically coated as latices, can be used and latices of poly(methyl methacrylate) are especially useful. Cohesivity of layer 16 can be controlled so as to provide the desired and predetermined fracturing. Waxy or resinous layers which are disruptible and which can be fractured sharply at the interfaces of particles thereof can be used to advantage. If desired, particulate materials can be added to the layer to reduce cohesivity. Examples of such particulate materials include, silica, clay particles, and particles of poly(tetrafluoroethylene).

Thermal imaging laminar medium 10 can be imaged by creating (in medium 10) a thermal pattern according to the information imaged. Exposure sources capable of providing radiation which can be imaged onto medium 10, and which can be converted by absorption into a predetermined pattern, can be used. Gas discharge lamps, xenon lamps, and lasers are examples of such sources.

The exposure of medium 10 to radiation can be progressive or intermittent. For example, a two-sheet laminar medium, as shown in FIG. 1, can be fastened onto a rotating drum for exposure of the medium through web material 12. A light spot of high intensity, such as is emitted by a laser, can be used to expose the medium 10 in the direction of rotation of the drum, while the laser is moved slowly in a transverse direction across the web, thereby to trace out a helical path. Laser drivers, designed to fire corresponding lasers, can be used to intermittently fire one or more lasers in a predetermined manner to thereby record information according to an original to be imaged. As is shown in FIG. 2, a pattern of intense radiation can be directed onto medium 10 by exposure to a laser from the direction of the arrows, the areas between the pairs of arrows defining regions of exposure.

If desired, a thermal imaging laminar medium of the invention can be imaged using a moving slit or stencils or masks, and by using a tube or other source which emits radiation continuously and which can be directed progressively or intermittently onto medium 10. Thermographic copying methods can be used, if desired. Further, with regard to practice of the present invention, it will be appreciated that imaged material viewed by reflected light makes use of the image twice, and accordingly would require only about half the density needed for viewing by transmission. Suitable modifications to the imaging and development of the imaged media should be made accordingly.

Preferably, a laser or combination of lasers will be used to scan the medium and record information in the form of very fine dots or pels. Semiconductor diode lasers and YAG lasers having power outputs sufficient to stay within upper and lower exposure threshold values of medium 10 will be preferred. Useful lasers may have power outputs in the range of from about 40 milliwatts to about 1000 milliwatts. An exposure threshold value, as used herein, refers to a minimal power required to effect an exposure, while a maximum power output refers to a power level tolerable by the medium before "burn out" occurs. Lasers are particularly preferred as exposing sources inasmuch as medium 10 may be regarded as a threshold-type of film; i.e., it possesses high contrast and, if exposed beyond a certain threshold value, will yield maximum density, whereas no density will be recorded below the threshold value. Especially preferred are lasers which are capable of providing a beam sufficiently fine to provide images having resolution as fine as 1,000 (e.g., 4,000 to 10,000) dots per centimeter.

Locally applied heat, developed at or near the interface of layer 14 and surface zone or layer 12*b* can be intense (about 400° C.) and serves to effect imaging in the manner described above. Typically, the heat will be applied for an extremely short period, preferably of the order of <0.5 microsecond, and exposure time span may be less than one millisecond. For instance, the exposure time span can be less than one millisecond and the temperature span in exposed regions can be between about 100° C. and about 1000° C.

Apparatus and methodology for forming images from thermally actuatable media such as the medium of the present invention are described in International Patent Application No. PCT/US91/06880 of Polaroid Corporation.

The imagewise exposure of medium 10 to radiation creates in the medium latent images which are viewable upon separation of the sheets thereof (12 and 20) as shown in FIG. 2. Sheet 20 can comprise any of a variety of transparent plastic or other such materials, depending upon the particular application for image 10*b*. A transparent polyester (e.g., polyethylene terephthalate) sheet material is a preferred material for this purpose.

As already mentioned, separation of the sheets 12 and 20 produces a pair of complementary binary images, each of which comprises a plurality of first areas at which the imaging layer 14 is adhered to the underlying sheet 12 or 20 and a plurality of second areas at which the sheet 12 or 20 is free from the imaging layer 14. The first areas of the image on the sheet 12 comprise the areas covered by the portions 14*a* of the imaging layer 14, while the second areas of the same image comprise the areas from which the portions 14*b* of the imaging layer 14 have been removed. On the other hand, the first areas of the image on the sheet 20 comprise the areas covered by the portions 14*b* of the imaging layer 14, while the second areas of the same image comprise the gaps left by the portions 14*a* of the imaging layer 14 which remain on the sheet 12. The images on the sheets 12 and 20 are thus complementary, a white area in one image corresponding to a black area in the other. Either or both of these binary images may be convened into protectively reflected binary images in accordance with method aspects of the present invention. In FIGS. 3 to 5, and related discussion above, the image on sheet 20 is shown being convened, but it will be appreciated that no significant changes in the procedure are required to use the same process for the protection of the image on sheet 12.

Figure 7:
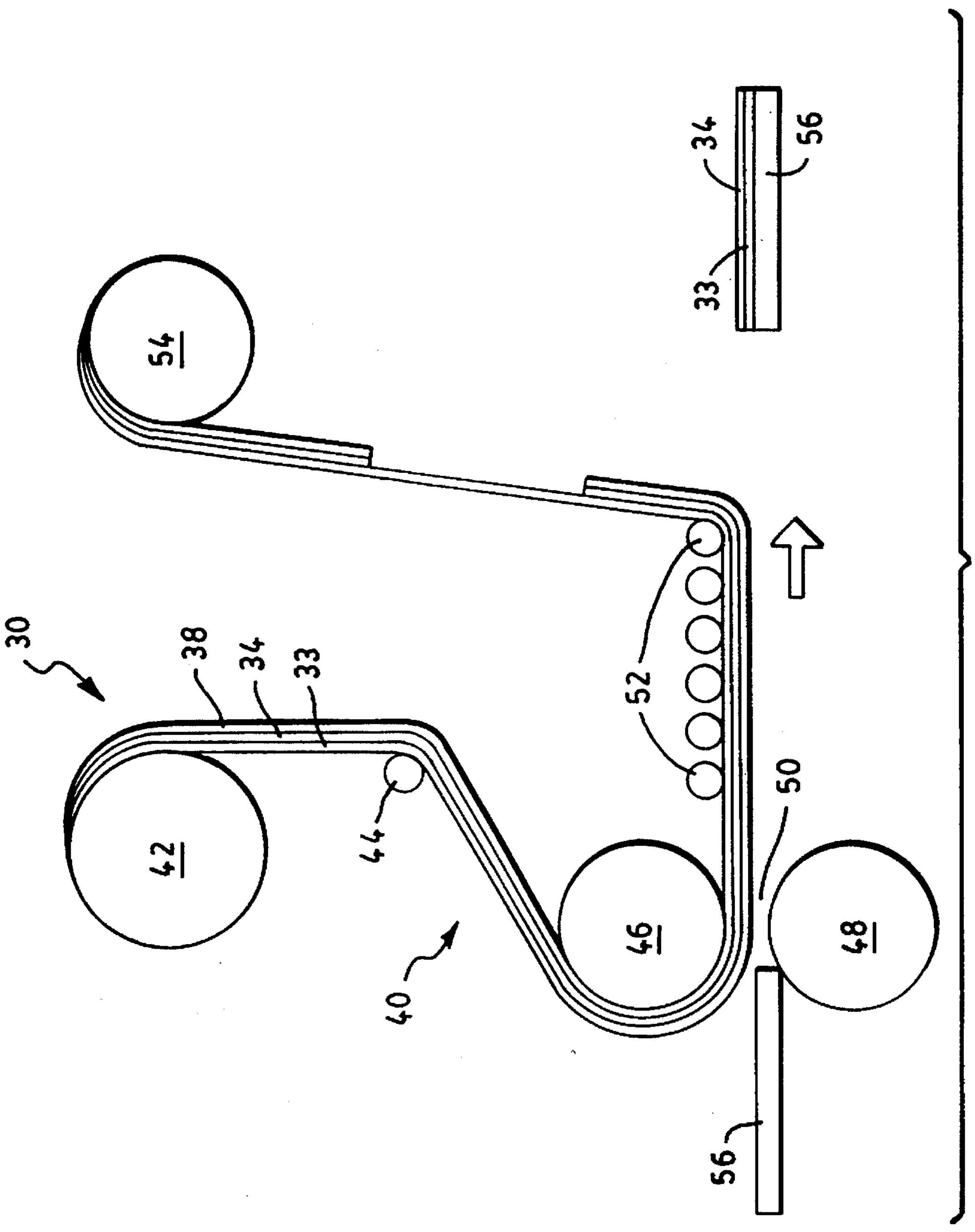
FIG. 7 schematically illustrates a side elevation of an apparatus useful for carrying out the process of the invention.

Transfer of a reflective protective overcoat onto an imaged transparency is preferably accomplished by lamination. FIG. 7 shows an apparatus 40 which may be used to carry out the lamination process of FIGS. 3 to 6. The apparatus 40 comprises a feed roll 42 on which is wrapped a supply of laminar transfer sheet 30 (which is shown for simplicity in FIG. 7 as comprising only the durable layer 34, the reflection layer 33, and the carrier web 38, although it may of course include other layers as described above), a first guide bar 44 and a pair of electrically heated rollers 46 and 48 having a nip 50 therebetween. The rollers 46 and 48 are provided with control means (not shown) for controlling the temperature of the rollers and the force with which they are driven toward one another, and thus the pressure exerted in the nip 50. The apparatus 40 further comprises a series of second guide bars 52 and a take-up roll 54.

Laminar transfer sheet 30 is fed from the feed roll 42, around the guide bar 44 and into nip 50 under a tension controllable by tension control means (not shown) provided on the feed roll 42 and/or the take-up roll 54. In substantial sychronicity, the imaged transparency 56 to be converted is fed (manually or mechanically), image surface side up, into the nip 50 below the laminar transfer sheet 30. For the reasons described above, the laminar transfer sheet may be made wider than the imaged transparency 56 so that excess laminar transfer sheet extends beyond both sides of the imaged transparency 56. The heat and pressure within the nip 50 laminate the imaged transparency 56 to the laminar transfer sheet 30 and the two travel together beneath the guide bars 52. Because the thin laminar transfer sheet 30 is more flexible than the imaged transparency 56, this sharp bending of the laminar transfer sheet causes in the area where the laminar transfer sheet 30 overlies the imaged transparency 56, separation of the reflective protective overcoat 1 (layers 33 and 34 shown in the FIGURE) from the carrier web 38 with the reflective protective overcoat 1 remaining attached to the imaged transparancy 56, whereas in areas where the laminar transfer sheet 30 does not overlie the imaged transparency 56, the reflective protective overcoat 1 remains attached to the carrier web 38. The carrier web 38, and the areas of the durable layer 34 and pigment layer 33 remaining attached thereto are wound onto the take-up roll 54.

The following Examples are now provided, though by way of illustration only, to show details of particularly preferred known reagents, conditions, and techniques used in the process of the present invention. All parts, ratios, and proportions, except where otherwise indicated, are by weight.

EXAMPLES

Preparation of Transparent Binary Image

A thermal imaging medium is prepared as follows:

First, onto a first sheet of poly(ethylene terephthalate) of 1.75 mil (44 μm) thickness (ICI Type 3284 film, available from ICI Americas, Inc., Hopewell, Va.) are deposited in succession a 2.4 μm thick stress-absorbing layer of polyurethane (a mixture of 90% ICI Neotac R-9619 and 10% ICI NeoRez R-9637, both available from ICI Resins U.S. Wilmington, Mass.); a 1.3 μm thick heat-activatable layer of poly(styrene-co-acrylonitrile); a 1 μm thick layer of carbon black pigment, poly(vinyl alcohol) (PVA), 1,4-butanediol diglycidyl ether, and a fluorochemical surfactant (FC-171, available from the Minnesota Mining and Manufacturing Corporation, St. Paul, Minn. 55144-1000) at ratios, respectively of 5:1:0.18:0.005; a 0.6 μm thick release layer comprising polytetrafluoroethylene, silica, and hydroxyethylcellulose (Natrosol +330, available from Aqualon Incorporated, Bath, Pa. 18014), at ratios, respectively, of 0.5:1:0.1; and a 2.2 μm thick layer of Neocryl BT 520 copolymer (available from ICI Resins U.S.) containing acidic groups.

To form the second adhesive layer, 5 parts of butyl acrylate, 82 parts of butyl methacrylate, and 13 parts by weight of N,N-dimethylaminoethyl acrylate are copolymerized with AIBN (2,2'azobisizobutyronitrile) to form a copolymer having a number average molecular weight of about 40,000 and a glass transition temperature of +11° C. A coating solution is prepared comprising 11.90 parts of this copolymer, 2.82 parts of trimethylolpropane triacrylate (TMPTA, available as Ageflex TMPTA from CPS Chemical Company, Old Bridge, N.J. 08857), 0.007 parts of 4-methoxyphenol (a free radical inhibitor), 1,14 parts of 2,2-dimethoxy-2-phenyl-acetophenone (a photoinitiator, available as Irgacure 651 from Ciba-Geigy Corporation), 0.037 parts of tetrakis{methylene(3,5-di-tert-butyl-4-hydroxyhydrocinnamate)}methane (an anti-oxidant, available as Irganox 1010 from Ciba-Geigy Corporation), 0.037 parts of thiodiethylene bis(3,5-di-tert-butyl-4 hydroxy) hydro-cinnamate (an anti-oxidant, available as Irganox 1035 from Ciba-Geigy), and 58.28 parts of ethyl acetate solvent. This coating solution is coated onto a 4 mil (101μm) poly(ethylene terephthalate) film (ICI Type 527 anti-static treated film, available from ICI Americas, Inc., Hopewell, Va.; this film forms the second web of the imaging medium) and dried in an oven at about 85° C. (185° F.) to a coating weight of about 9400 mg/m$^2$ to form a hardenable second adhesive layer approximately 10 μm thick.

The first and second poly(ethylene terephthalate) sheets are immediately brought together with the adhesive layers in face-to-face contact, the 4 mil sheet being in contact with a rotating steel drum. A rubber roll having a Durometer hardness of 70–80 is pressed against the 1.75 mil sheet. The resulting web of laminar medium is then passed in line, approximately 30 seconds after lamination, under a radio-frequency-powered source of ultraviolet radiation, with the 4 mil sheet facing, and at a distance of about 2.5 inches (6.4 cm.) from, the source (a Model DRS-111 Deco Ray Conveyorized Ultraviolet Curing System, sold by Fusion UV Curing Systems, 7600 Standish Place, Rockville, Md. 20855-2798), which serves to cure adhesive layer 20.

After curing, the web of imaging medium is passed through a slitting station where edgewise trimming along both edges of the medium is performed in the machine direction. The resultant trimmed web is then wound onto a take-up roll.

Individual sheets of the thermal imaging medium are cut from the resultant roll and imaged by laser exposure through the 1.75 mil sheet using high intensity semiconductor laser exposure through the 1.75 mil sheet (by scanning of the imaging medium orthogonally to the direction of the drum rotation). The exposed imaging medium is removed from the drum and the two sheets of the imaging medium are separated to provide a first transparent binary image on the first sheet and a second (and complementary) transparent binary image on the second sheet (the principal image).

EXAMPLE 1

A laminar transfer sheet is prepared having a support layer (i.e. carrier web) of 0.92 mil (23 μm) smooth poly(ethylene terephthalate), a 2 μm thick release layer of polymeric wax (0.2 μm Wax Emuls from Michelman, a 2 μm thick durable layer, a 2 μm thick reflection layer, and a 2 μm thick adhesive layer of a hot-melt adhesive. The durable layer is coated from the following formulation: NeoCryl B-728 (20.00% wt., from ICI), Silwet 7604 (0.10% wt, from Union Carbide), and methyethylketone (79.90% wt.). The reflection layer is coated from the following formulation: Rhoplex HG44M (28.47% wt., a polymer latex available from Rohm and Haas), $TiO_2$ (15.88 dispersion % wt., 50% solids), Miranol (0.41% wt., an amphoteric surfactant from Miranol Chemical Co.), Aerosol OT (0.41% wt., an anionic surfactant from American Cyanamid), ammonium hydroxide (1.32% wt.), and deionized water (56.33% wt.). The adhesive layer was coated from the following formulation: Bostik 7942 (20.00% wt., from Bostik), and ethyl acetate (80.00 % wt.). In coating each layer, the sheet is dried for 10 minutes in a hood then placed for 5 minutes in a 70° C. oven.

In a Talboy laminator, the laminar transfer sheet is brought into interfacial contact with a second transparent binary image (obtained from the thermal imaging medium prepared in accord with the method set forth above) such that the adhesive layer of the laminator sheet is in contact with the exposed image surface of the transparent binary image. The laminar transfer sheet and the binary image are then subjected to heat and pressure in the laminator (set at either 250° F. or 300° F. with a speed of about ½ inches/second and a nitrogen pressure setting of about 32 psi). Following lamination, the carrier web is removed by hand peeling, resulting in a finished protectively reflected binary image.

EXAMPLE 2

A laminar transfer sheet is prepared by the process presented in Example 1, except that the adhesive layer is coated from the following formulation: Daran 8600C (36.36% wt., from the W. R. Grace Co.) and deionized water (63.64% wt.). Lamination and subsequent removal of the carrier web proceeds as set forth in Example 1.

EXAMPLE 3

A laminar transfer sheet is prepared by the process presented in Example 1, except that the reflection layer is coated from the following formulation: HG44M (35.29% wt., a polymer emulsion from Rohm & Haas), $TiO_2$ dispersion (7.94% wt., 50% solids), ammonium hydroxide (1.32 % wt.), Miranol (0.41% wt., an amphoteric surfactant from Miranol Chemical Co.), Aerosol OT (0.41% wt., an anionic surfactant from American Cyanamid), and deionized water (55.45% wt.). Lamination and subsequent removal of the carrier web proceeds as set forth in Example 1.

EXAMPLE 4

A laminar transfer sheet is prepared by the process presented in Example 1, except that the durable layer is coated from the following formulation: poly (styrene-co-acrylonitrile) (20.00% wt., from the Dow Chemical Co.), toluene (20.00% wt.), and methylethyl ketone (60.00% wt.). Lamination and subsequent removal of the carrier web proceeds set forth in Example 1.

EXAMPLE 5

A laminar transfer sheet is prepared by the process presented in Example 1, except that the durable layer is coated from the following formulation: Daran SL158

(36.36% wt., from W. R. Grace) and deionized water (63.64% wt.). Lamination and subsequent removal of the carrier web proceeds as set forth in Example 1.

EXAMPLE 6

A laminar transfer sheet is prepared by the process presented in Example 1, except that the durable layer is coated from the following formulation: HG44M (44.44% wt., a polymer emulsion from Rohm & Haas), Silwet 7604 (0.10% wt., silicone block copolymer based surfactant from Union Carbide), and deionized water (55.46% wt.). Lamination and subsequent removal of the carrier web proceeds as set forth in Example 1.

EXAMPLE 7

A laminar transfer sheet is prepared by the process presented in Example 1, except that the separate clear durable layer is omitted, whereby protective and reflective functionality is provided by the reflective layer ("reflective durable layer"). Lamination and subsequent removal of the carrier web proceeds as set forth in Example 1.

EXAMPLE 8

A laminar transfer sheet is prepared by the process presented in Example 2, except that the separate clear durable layer is omitted, whereby protective and reflective functionality is provided by the reflective layer "reflective durable layer"). Lamination and subsequent removal of the carrier web proceeds as set forth in Example 1.

EXAMPLES 6 to 16

Laminar transfer sheets are prepared by the process presented in Examples 1 to 8. Each of the respective laminar transfer sheets (Examples 9 to 16) are then laminated onto an imaged transparency (Polaview 721, from Polaroid Corporation; imaged on a Canon photocopier). The remaining lamination parameters were as presented in Example 1. Removal of the carrier web proceeds as set forth in Examples 1 to 8, respectively.

EXAMPLES 17 to 24

Laminar transfer sheets are prepared by the processes presented in Examples 1 to 8. Each of the respective laminar transfer sheets (Examples 9 to 16) are then laminated onto a 7 mil thick second transparent binary image (obtained from the thermal imaging medium prepared in accord with the method set forth above) such that the adhesive layer of the laminar sheet was in contact with the exposed image surface of the transparent binary image. The remaining lamination parameters were as presented in Example 1.

EVALUATION

By visual observation, all samples prepared in accord with each of Examples 1 to 24, wherein transfer of the reflective protective overcoat occurred (See, Table A, infra), were viewable as reflection images.

To evaluate durability, samples prepared in accord with each of Examples 1 to 24 were submitted to a Scratch Resistance Test. In this regard, the tested media were scratched back and forth with a finger nail at moderate pressure. Reflective protective overcoats which are scratched through are rated as "Fail". Those which are not scratched through are rated as "Pass". The results are presented in the following Table A.

TABLE A

| Sample Preparation | Lamination Temperature, °F. | Transfer | Durability |
|---|---|---|---|
| Example 1 | 250/300 | Yes/Yes | Pass/Pass |
| Example 2 | 250/300 | Yes/Yes | Pass/Pass |
| Example 3 | 250/300 | Yes/Yes | Pass/Pass |
| Example 4 | 250/300 | Yes/Yes | Pass/Pass |
| Example 5 | 250/300 | Yes/Yes | Pass/Pass |
| Example 6 | 250/300 | Yes/Yes | Pass/Pass |
| Example 7 | 250/300 | Yes/Yes | Pass/Pass |
| Example 8 | 250/300 | Yee/Yes | Pass/Pass |
| Example 9 | 250/300 | Yes/Yes | Pass/Pass |
| Example 10 | 250/300 | Yes/Yes | Pass/Pass |
| Example 11 | 250/300 | Yes/Yes | Pass/Pass |
| Example 12 | 250/300 | Yes/Yes | Pass/Pass |
| Example 13 | 250/300 | No/Yes | —/Pass |
| Example 14 | 250/300 | No/Yes | —/Pass |
| Example 15 | 250/300 | Yes/Yes | Pass/Pass |
| Example 16 | 250/300 | No/Yes | —/Pass |
| Example 17 | 300 | Yes/Yes | Pass/Pass |
| Example 18 | 300 | Yes/Yes | Pass/Pass |
| Example 19 | 300 | Yes/Yes | Pass/Pass |
| Example 20 | 300 | Yes/Yes | Pass/Pass |
| Example 21 | 300 | Yes/Yes | Pass/Pass |
| Example 22 | 300 | Yes/Yes | Pass/Pass |
| Example 23 | 300 | Yes/Yes | Pass/Pass |
| Example 24 | 300 | Yes/Yes | Pass/Pass |

In sum, in each of the samples, the reflective protective overcoats generally transferred well at 250° and 300° F. Reflective protective overcoats incorporating NeoCryl B728 and SAN based durable layers appeared to be more robust in terms of transfer capability in that they performed equally well at both 250° F. and 300° F. Regardless, each of the samples, wherein transfer occurred, displayed good scratch resistance.

We claim:

1. A protectively reflected binary image comprising a thermally imaged transparency and a reflective protective overcoat;

the image transparency comprising a transparent supporting substrate and a binary image supported on the substrate, the binary image being a plurality of first areas at which a porous or particulate image-forming substance is adhered to the substrate and a plurality of second areas at which the substrate is free from the image-forming substance;

the reflective protective overcoat having a uniform opaque area corresponding with the extents of the binary image and comprising at least a durable layer, the opaque area incorporating therein a substantially uniform distribution of reflective pigments, the reflective protective overcoat further comprising a reflective layer configured as said opaque area interposed between the durable layer and the thermally imaged medium.

the reflective protective overcoat being interfacially bonded to the thermally imaged transparency such that the binary image is interposed between the transparent supporting substrate and the reflective protective overcoat and whereby the protected binary image may be viewed through the transparent supporting substrate as reflected against the opaque area.

2. The protectively reflected binary image of claim 1, wherein the thickness of the reflective layer is less than approximately 10 μm, and the thickness of the durable layer is less than approximately 10 μm.

3. The protectively reflected binary image of claim 1, wherein the thickness of the reflective layer is less than approximately 10 μm.

4. The protectively reflected binary image of claim 1, wherein the reflective pigment is titanium dioxide.

5. The protectively reflected binary image of claim 1, further comprising an adhesive layer and wherein the reflective protective overcoat is bonded to the thermally imaged medium by the adhesive layer.

6. The protectively reflected binary image of claim 1, wherein the binary image has been formed by:

providing a layer of a porous or particulate image material on a heat-activatable image-forming surface of a substrate, the layer of the imaging material having a cohesive strength greater than the adhesive strength between the layer and the substrate, thereby providing a thermal imaging medium;

imagewise subjecting portions of the thermal imaging medium to exposure to brief and intense radiation, thereby firmly attaching exposed portions of the imaging material to the substrate; and removing from the substrate those portions of the image-forming substance not exposed to the radiation.

7. A protectively reflected binary image wherein a binary image is protected and reflectively viewable through a transparent supporting substrate, the protectively reflected binary image comprising a thermally imaged transparency and a reflective protective overcoat;

the imaged transparency comprising a transparent supporting substrate and a binary image supported on the substrate, the binary image being a plurality of first areas at which a porous or particulate image forming substance is adhered to the substrate and a plurality of second areas at which the substrate is free from the image-forming substance;

the reflective protective overcoat consisting essentially of a reflective layer, a durable layer, and an adhesive layer, and wherein the reflective layer is a uniform opaque area corresponding with the extents of the binary image, the reflective layer incorporating therein reflective pigments uniformly distributed in a macromolecular binder; and the reflective protective overcoat being interfacially bonded to the imaged transparency through the adhesive layer such that a) the binary image is interposed between the transparent supporting substrate and the reflective protective overcoat, b) the adhesive layer is interposed immediately between the reflective layer and the binary image, and c) the reflective layer is interposed between the durable layer and the thermally imaged transparency.

8. The protectively reflected binary image of claim 7, wherein the thickness of the reflective layer is less than approximately 10 μm and the thickness of the durable layer is less than approximately 10 μm.

9. The protectively reflected binary image of claim 7, wherein the reflective pigment is titanium dioxide.

* * * * *